United States Patent
Shull

(10) Patent No.: US 6,667,828 B2
(45) Date of Patent: Dec. 23, 2003

(54) APPARATUS AND METHOD USING A NONLINEAR OPTICAL CRYSTAL

(75) Inventor: William A. Shull, Aptos, CA (US)

(73) Assignee: Zygo Corporation, Middlefield, CT (US)

( * ) Notice: Subject to any disclaimer, the term of this patent is extended or adjusted under 35 U.S.C. 154(b) by 13 days.

(21) Appl. No.: 10/013,637

(22) Filed: Dec. 10, 2001

(65) Prior Publication Data

US 2003/0011872 A1 Jan. 16, 2003

Related U.S. Application Data

(60) Provisional application No. 60/305,483, filed on Jul. 13, 2001.

(51) Int. Cl.[7] .............................. H01S 3/00; G02F 1/35
(52) U.S. Cl. ........................................ 359/333; 359/330
(58) Field of Search .............................. 359/330, 328, 359/333; 372/22

(56) References Cited

U.S. PATENT DOCUMENTS

| | | | | |
|---|---|---|---|---|
| 3,644,845 A | * | 2/1972 | Harris | 331/175 |
| 4,987,376 A | * | 1/1991 | Hughes | 330/4.3 |
| 5,027,361 A | | 6/1991 | Kozlovsky et al. | |
| 5,862,163 A | * | 1/1999 | Umezu et al. | 372/21 |

OTHER PUBLICATIONS

R.L. Byer, "Parametric Oscillators and Nonlinear Materials", Department of Applied Physics, Stanford University, California, U.S.A., pp. 47–77.

Chuangtian Chen, "Development of New Nonlinear Optical Crystals in the Borate Series", Materials for Nonlinear Optics: Chemical Perspectives, Chapter 24, 1991, pp. 360–379.

Coherent, Inc., Laser Group, Innova 300C FreD, Technical Data.

* cited by examiner

*Primary Examiner*—Mark Hellner
(74) *Attorney, Agent, or Firm*—Fish & Richardson P.C.

(57) ABSTRACT

The invention features a nonlinear optical crystal assembly and a gas mixture that surrounds the nonlinear crystal. The gas mixture reduces photochemical degradation of the nonlinear crystal caused by exposure of the nonlinear crystal to a high power light source. For example, the nonlinear crystal may be a borate-based nonlinear crystal such as BBO and the gas mixture may include a hydrogen and oxygen to repair broken bonds in boron-oxygen rings of the borate-based crystal. The assembly may be incorporated into a light source, and applications requiring such a light source, such as, e.g., applications requiring ultraviolet light. Furthermore, the nonlinear crystal assembly may be placed inside an optical cavity.

45 Claims, 5 Drawing Sheets

APPARATUS AND METHOD USING A NONLINEAR OPTICAL CRYSTAL

CLAIM OF PRIORITY

This application claims priority under 35 USC §119(e) to U.S. patent application Serial No. 60/305,483, filed on Jul. 13, 2001, the entire contents of which are hereby incorporated by reference.

TECHNICAL FIELD

This invention relates to nonlinear optical crystals, and more particularly to the conversion of optical radiation having a first frequency to optical radiation having a second frequency using nonlinear optical crystals.

BACKGROUND

There are many known sources of optical radiation, which can be characterized by a frequency, or frequency spectrum. A method of generating optical radiation of a desired frequency is to generate optical radiation of a first frequency, different from the desired frequency, and then to convert this to optical radiation having the desired frequency. For example, a pump laser can generate optical radiation having a frequency $\omega$ (i.e., fundamental frequency). This optical radiation can then be converted to optical radiation having a frequency $2\omega$ (i.e., harmonic frequency) by appropriate illumination of a nonlinear frequency doubling crystal with the optical radiation having frequency $\omega$.

The conversion efficiency of a pump laser beam into its harmonics is generally low. The power of a harmonic beam is related to the power of the fundamental pump beam in a nonlinear way. Hence it is not uncommon for high power pump lasers to be tightly focused onto a nonlinear crystal in order to generate sufficient power in the harmonic. For example, a 25 watt (W) pump laser may be focused onto a nonlinear crystal to power densities of about 250,000 $W/cm^2$, generating about 10 to 20 milliwatts of power in the frequency doubled output beam.

The high power densities of pump laser beams in these systems can locally damage the nonlinear crystal. This, in turn, can lead to degradation of the power levels of the output beam. For example, in some cases the damage to the nonlinear crystal results in increased absorption of the pump beam by the nonlinear crystal.

A technique commonly used to overcome undesirable degradation of the power levels of the output beam is to vary the area of the nonlinear crystal on which the pump beam is focused. This can be achieved, for example, by translating the nonlinear crystal. In addition, increasing the power of the fundamental pump wavelength can compensate for absorption losses. However, the amount of additional power available may be limited and will depend on the laser source.

In applications where high pump beam power is required to maintain sufficient harmonic output power, the pump lasers used are typically large, complex, expensive systems, demanding expensive utilities (e.g., 3-phase power, flowing cooling water and high purity nitrogen). Such pump lasers are limiting in applications having space, utility, and/or budget constraints.

SUMMARY

The invention features a nonlinear optical crystal assembly and a gas mixture that surrounds the nonlinear crystal. The gas mixture reduces photochemical degradation of the nonlinear crystal caused by exposure of the nonlinear crystal to a high power light source. The assembly may be incorporated into a light source, and applications requiring a light source, such as, e.g., applications requiring ultraviolet light. In some embodiments, the nonlinear crystal assembly may be placed inside an optical cavity. Generally, the nonlinear crystal converts optical radiation from a pump source having a first frequency, to optical radiation having a second frequency, different from the first frequency.

In general, in one aspect, the invention features an optical system including: a light source providing a pump beam having a first frequency; a nonlinear optical crystal positioned to transform at least a portion of the pump beam into an output beam having a second frequency different from the first frequency; and an enclosure filled with gas and surrounding the nonlinear optical crystal, the gas including hydrogen and oxygen in amounts sufficient to reduce photochemical degradation of the nonlinear optical crystal caused by the pump beam. In some embodiments, the gas is sealed within the enclosure. In other embodiments, for example, the system further includes a gas source coupled to the enclosure for flowing the gas into the enclosure.

In general, in another aspect, the invention an optical system including: a light source providing a pump beam having a first frequency; a nonlinear optical crystal positioned to transform at least a portion of the pump beam into an output beam having a second frequency different from the first frequency; an enclosure surrounding the nonlinear optical crystal; and a gas source of hydrogen and oxygen coupled to the enclosure, wherein during operation the gas source provides the enclosure with amounts of hydrogen and oxygen sufficient to reduce photochemical degradation of the nonlinear optical crystal caused by the pump beam.

Embodiments of either optical system may include any of the following features.

The enclosure may surround the nonlinear optical crystal and the light source.

The system may further include a plurality of mirrors defining an optical cavity surrounding the nonlinear optical crystal. For example, the optical cavity may be resonant at the first frequency. Furthermore, the light source may located within the optical cavity. Moreover, the light source may include a gain medium and the optical cavity may resonantly enhance emission from the gain medium to generate the pump beam. For example, the light source may include a gas tube (e.g., an Argon ion gas tube) and electrical source coupled to the gas tube, and wherein during operation the electrical source produces an ion discharge in the gas tube. The gas tube may be air-cooled. Alternatively, the light source (e.g., a single frequency laser) may be located outside of the optical cavity, and wherein during operation the light source couples the pump beam at the first frequency into the optical cavity. In either case, the enclosure may also surround the optical cavity.

The nonlinear optical crystal may include Boron and Oxygen, for example, it may be one of Barium Beta Borate, Lithium Triborate, and Cesium Lithium Triborate.

The second frequency may be a harmonic of the first frequency. For example, the second frequency may be in the UV portion of the electromagnetic spectrum.

The gas including hydrogen and oxygen may further include a buffer gas, such as, for example, Argon or Nitrogen. The ratio of hydrogen to oxygen in the enclosure gas may about one to one. Furthermore, the gas including hydrogen and oxygen may have a hydrogen concentration of less than or equal to about 10%. Also, the gas including hydrogen and oxygen may have an oxygen concentration of less than or equal to about 10%. Furthermore, both the hydrogen and oxygen may have a concentration of less than or equal to about 10%. Similarly, the respective concentrations may be less than or equal to about 3%, and may be as low as about 0.1%. The hydrogen may include, e.g., hydrogen molecules or hydrogen ions. The oxygen may include, e.g., oxygen molecules, oxygen ions, or ozone. Furthermore, for example, the gas may include about 95% Argon, about 2.5% oxygen, and about 2.5% hydrogen. The concentration refers to the partial pressure concentration of the respective gases.

Furthermore, the gas in the enclosure may have a pressure greater than ambient pressure (i.e., greater than about 1 atmosphere), for example, the gas pressure may be greater than the ambient pressure by an amount up to 10 Psi.

The optical system may further include a heating element thermally contacted to the nonlinear optical crystal and a temperature controller coupled to the heating element.

For example, during operation the temperature controller may cause the temperature of the nonlinear optical crystal to be at least 50° C., or to be at least 70° C.

The light source may be an Argon ion laser, a Krypton ion laser, a YAG laser, or an Alexandrite laser, or it may include the corresponding gain medium when the system includes an optical cavity and the light source is positioned within the cavity. The light source may be a continuous wave laser. The light source may be an air-cooled laser.

In another aspect, the invention features an optical microscopy system including: either of the optical systems described above; and a microscope positioned to receive the output beam from the optical source.

Furthermore, in general, in another aspect, the invention features an nonlinear optical crystal assembly including: a nonlinear optical crystal positioned to transform at least a portion of a pump beam having a first frequency into an output beam having a second frequency different from the first frequency; and an enclosure filled with gas and surrounding the nonlinear optical crystal, the gas including hydrogen and oxygen in amounts sufficient to reduce photochemical degradation of the nonlinear optical crystal caused by the pump beam.

Furthermore, in general, in another aspect, the invention features a nonlinear optical crystal assembly including: a nonlinear optical crystal positioned to transform at least a portion of a pump beam having a first frequency into an output beam having a second frequency different from the first frequency; an enclosure surrounding the nonlinear optical crystal; and a gas source of hydrogen and oxygen coupled to the enclosure, wherein during operation the gas source provides the enclosure with amounts of hydrogen and oxygen sufficient to reduce photochemical degradation of the nonlinear optical crystal caused by the pump beam.

Either of the nonlinear optical crystal assemblies may include any of the corresponding features described above for the optical systems.

In general, in another aspect, the invention features an optical method including: directing a pump beam having a first frequency to a nonlinear optical crystal positioned to transform at least a portion of a pump beam into an output beam having a second frequency different from the first frequency; and surrounding the nonlinear optical crystal with a gas including hydrogen and oxygen in amounts sufficient to reduce photochemical degradation of the nonlinear optical crystal caused by the pump beam. Embodiments of the method may include any of the corresponding features described above for the optical systems.

Embodiments of the invention may include any of the following advantages:

Photodegradation of the nonlinear crystal can be reduced. As a result, the crystal may be used to efficiently produce a stable output beam from a nonlinear interaction in which one or more beams are directed to the crystal. For example, the power of a harmonic output beam generated by the interaction of a pump beam and the nonlinear crystal may remain substantially constant with the pump beam focused continuously on the same area of the nonlinear crystal and maintaining the pump beam at a substantially constant power. Moreover, reducing the photodegradation may reduce amplitude noise fluctuations in the output radiation.

Furthermore, a laser of reduced power and complexity may be used as a pump beam source in applications requiring substantial power at harmonic frequencies. For example, a system used to generate ultraviolet light may use an air-cooled pump laser to pump a nonlinear crystal. The output power of such a source may be in the range of at least milliwatts to tens of milliwatts.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
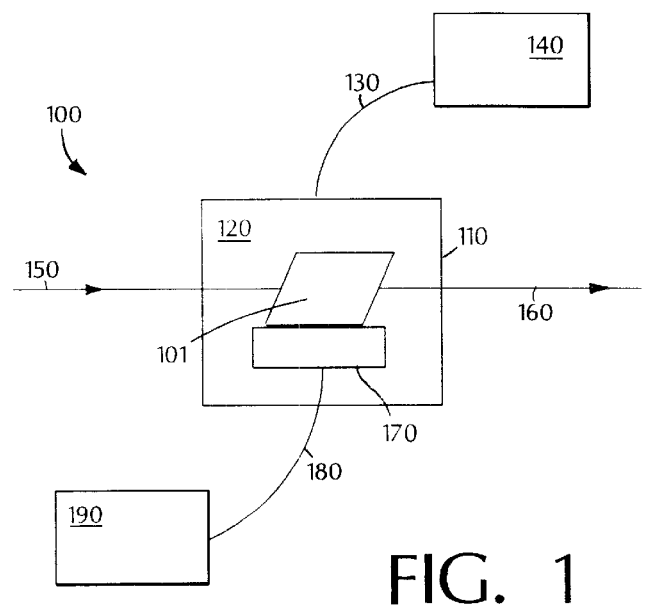
FIG. 1 is a schematic drawing of one embodiment of a nonlinear optical crystal assembly.

One embodiment of the invention is nonlinear crystal assembly 100, as shown in FIG. 1. Assembly 100 includes a Barium Beta Borate (BBO) nonlinear crystal 101 that is housed in an enclosure 110. Enclosure 110 provides a sealed environment for a gas mixture 120 (i.e., prevents gas mixture 120 from mixing with the ambient atmosphere outside of enclosure 110). Additionally, at least a portion of enclosure 110 is substantially transparent to visible and ultraviolet (UV) radiation. Gas mixture 120 surrounds nonlinear crystal 101. Enclosure 110 may optionally be connected to a gas supply 140 by a tube 130. Gas supply 140 stores gases that are used to form gas mixture 120. These gases are supplied to enclosure 110 through tube 130. Nonlinear crystal 101 is optionally coupled to a heating element 170, which can be used to control the temperature of the nonlinear crystal. A temperature controller 190 controls heating element 170. A cable 180 connects heating element 170 and temperature controller 190.

Gas mixture 120 contains, in part, some oxygen and some hydrogen. The ratio of oxygen to hydrogen is about one-to-one. Mixture 120 additionally contains a buffer gas, in this case Argon. The relative composition of gas mixture 120 is about 95% Argon, 2.5% Oxygen, and 2.5% Hydrogen, where the percent concentrations refer to partial pressure concentrations. The pressure of gas mixture 120 is about 3 Psi higher than ambient pressure. Additionally, nonlinear crystal 101 is heated to about 70° C.

Optical radiation in the form of fundamental pump beam 150 having a first frequency ω is directed towards nonlinear crystal 101. A portion of the pump beam 150 incident on nonlinear crystal 101 interacts with nonlinear crystal 101 and is frequency-doubled, exiting nonlinear crystal 101 as harmonic output beam 160 having a frequency 2ω.

Due to the presence of gas mixture 120, spurious absorption of pump beam 150 by crystal 101 is limited and the pump beam intensity in crystal 101 remains substantially constant. As a result, the energy density of harmonic beam 160 is stabilized.

In the absence of gas mixture 120, the absorption of the pump beam would otherwise increase with prolonged exposure of the nonlinear crystal to high power-density pump beams. This occurs because nonlinear crystals can suffer from photochemical degradation due to prolonged exposure of the nonlinear crystal to high power-density pump beams. Because the power of the frequency-doubled harmonic is related to the power of the fundamental pump beam in a nonlinear way (e.g., (Power 2ω)∝(Power ω)$^2$), any reduction in the fundamental pump beam energy due to absorptive losses in the nonlinear crystal will dramatically reduce the power of the frequency-doubled output. These affects are exacerbated when the nonlinear crystal is placed in a resonant cavity designed to build up the intensity of the pump beam. The intensity of radiation within the cavity is characterized by a parameter called the quality factor (Q). The Q is inversely proportional to the power dissipated by the cavity. Hence, an increase in absorption by a nonlinear crystal within the cavity will decrease the Q of the cavity and reduce the intensity of the pump radiation within the cavity.

Increased absorption of the pump beam is believed to be the result of photochemical degradation of the BBO crystal. The photochemical degradation is due to exposure of the crystal to the high power densities of the pump beam and is believed to be due to the breaking of hydrogen, oxygen, and/or hydroxyl bonds in boron-oxygen rings of the BBO crystal. In particular, the high power densities associated with focused pump beams may result in the thermal breaking of low-energy bonds loosely attaching the hydroxyl (OH—), oxygen (O), or hydrogen (H) species to the borate-oxygen rings in the nonlinear crystal.

I postulate that the presence of oxygen and hydrogen in the gas mixture 120 surrounding nonlinear crystal 101 maintains the beneficial chemical structure of the oxygen, hydrogen, or hydroxyl bonds surrounding the boron-oxygen ring structure of the nonlinear crystal. Furthermore, the elevated gas pressure surrounding nonlinear crystal 101 is expected to reduce outward diffusion of beneficial ions containing oxygen and hydrogen from within the nonlinear crystal bulk. Also, elevating the temperature of the nonlinear crystal 101 slightly above ambient temperatures can enhance the diffusion of the components of gas mixture 120 into the nonlinear crystal.

I further believe that radiation of an appropriate wavelength may help facilitate the photochemistry needed to reestablish the favorable chemical bonding within nonlinear crystal 101 for low pump beam absorption. For example, the radiation may be in the UV range of the optical spectrum. In some embodiments, the frequency doubled harmonic beam 160 can provide radiation having the appropriate wavelength. In other embodiments, the appropriate wavelength may be provided by another source (e.g., by an arc lamp).

While a specific embodiment of the invention is shown in FIG. 1, the invention is not so limited. For example, the embodiment described above includes a BBO nonlinear crystal, however nonlinear crystal 101 may be a different nonlinear optical crystal. For example, nonlinear crystal 101 may be a borate-based nonlinear crystal (i.e., a nonlinear crystal containing boron/oxygen rings). Such nonlinear crystals include, for example, Barium Beta Borate (BBO), Lithium Triborate (LBO), and Cesium Lithium Triborate (CLBO).

Furthermore, although gas mixture 120 includes Argon, Oxygen and Hydrogen, gas mixture 120 may be any gas mixture containing both oxygen and hydrogen. The oxygen in mixture 120 may be in any form (e.g., molecular, ionic, superionic, ozone, or in oxygen-containing compounds). The hydrogen in mixture 120 may be in any form (e.g., molecular, ionic, or in hydrogen containing compounds). Furthermore, the ratio of oxygen to hydrogen in gas mixture may be of any ratio (e.g., about five-to-one, about four-to-one, about three-to-one, about two-to-one, about one-to-two, about one-to-three, about one-to-four, about one-to-five respectively, etc.). Also, the buffer gas in gas mixture 120 may be different from Argon (e.g., other noble gases such as Neon, Xenon, Krypton, etc., as well as Nitrogen), or gas mixture 120 may contain several different buffer gases.

Additionally, gas mixture 120 can be at any pressure. For example, gas mixture 120 can be at a pressure lower than the pressure of the ambient atmosphere. Alternatively, gas mixture 120 can be at a pressure higher than the pressure of the ambient atmosphere. For example, the pressure of gas mixture 120 can be at least 1 Psi greater than ambient pressure (e.g., at least 2 Psi greater than ambient pressure, at least 3 Psi greater than ambient pressure, at least 4 Psi greater than ambient pressure, at least 5 Psi greater than ambient pressure). In some embodiments, the pressure of gas mixture 120 can be substantially equal to the gas pressure of the ambient atmosphere.

The relative concentration of hydrogen and oxygen in gas mixture 120 can be different from about 2.5% of each gas. For example, gas mixture 120 may contain more than about 2.5% of hydrogen (e.g., at least 3% of hydrogen, at least 4% of hydrogen, at least 5% of hydrogen, at least 10% of hydrogen). Alternatively, gas mixture 120 may contain less than 2.5% of hydrogen (e.g., at most 2% of hydrogen, at most 1% of hydrogen, at most 0.5% of hydrogen, at most 0.1% of hydrogen, at most 0.01% of hydrogen). Similarly, gas mixture 120 may contain more than about 2.5% of oxygen (e.g., at least 3% of oxygen, at least 4% of oxygen, at least 5% of oxygen, at least 10% of oxygen). Alternatively, gas mixture 120 may contain less than 2.5% of oxygen (e.g., at most 2% of oxygen, at most 1% of oxygen, at most 0.5% of oxygen, at most 0.1% of oxygen, at most 0.01% of oxygen).

In the above-described embodiment, gas mixture 120 surrounding nonlinear crystal 101 is substantially static.

Alternatively, gas mixture 120 can be in the form of continuously flowing gas. In such embodiments, the enclosure is not necessarily sealed with respect to the ambient atmosphere. In these embodiments, any rate of flow of gas mixture 120 sufficient to substantially prevent the flow of gases from the ambient atmosphere into the enclosure is sufficient and is considered within the scope of the invention.

Furthermore, while the embodiment described above operates with nonlinear crystal 101 at a temperature of about 70° C., the invention is not so limited. Nonlinear crystal can be operated at other temperatures. For example, nonlinear crystal 101 can be at about room temperature (e.g., about 25° C.). Alternatively, nonlinear crystal 101 can be below room temperature. In still other alternative embodiments the temperature of nonlinear crystal 101 can be greater than room temperature (e.g., greater than 25° C., greater than 40° C., greater than 50° C., greater than 60° C., greater than 70° C., greater than 80° C., greater than 90° C., greater than 100° C.).

Furthermore, the fundamental pump beam 150 and harmonic output beam 160 are not limited to radiation having wavelengths at 488 nanometers and 244 nanometers respectively. Generally, pump beam 150 can be optical radiation having any wavelength (e.g., less than 2000 nanometers, less than 1500 nanometers, less than 1000 nanometers, less than 800 nanometers, less than 600 nanometers, less than 500 nanometers, less than 400 nanometers). Similarly, harmonic output beam 160 can be to optical radiation having any wavelength (e.g., less than 1000 nanometers, less than 800 nanometers, less than 600 nanometers, less than 500 nanometers, less than 400 nanometers, less than 300 nanometers, less than 200 nanometers, less than 150 nanometers).

Pump beam 150 is also characterized by a frequency $\omega$, related to its wavelength, $\lambda$, by $\omega = c/\lambda$, where c is the speed of light. In the above-described embodiment, pump beam 150 is frequency-doubled by nonlinear crystal 101, and harmonic output beam 160 has a frequency equal to $2\omega$. In other embodiments, harmonic output beam 160 can have a frequency that is any harmonic frequency of pump beam 150 (e.g., $3\omega$, $4\omega$, $5\omega$, etc.).

Additional embodiments of the current invention include apparatus based on nonlinear crystal assembly 100 that include an energy source for providing fundamental pump beam. Furthermore, such apparatus may include an optical cavity having a resonant frequency corresponding to the frequency of fundamental pump beam 150. The optical cavities of such systems generally enclose nonlinear crystal 101. Examples of such embodiments are described below.

Figure 2:
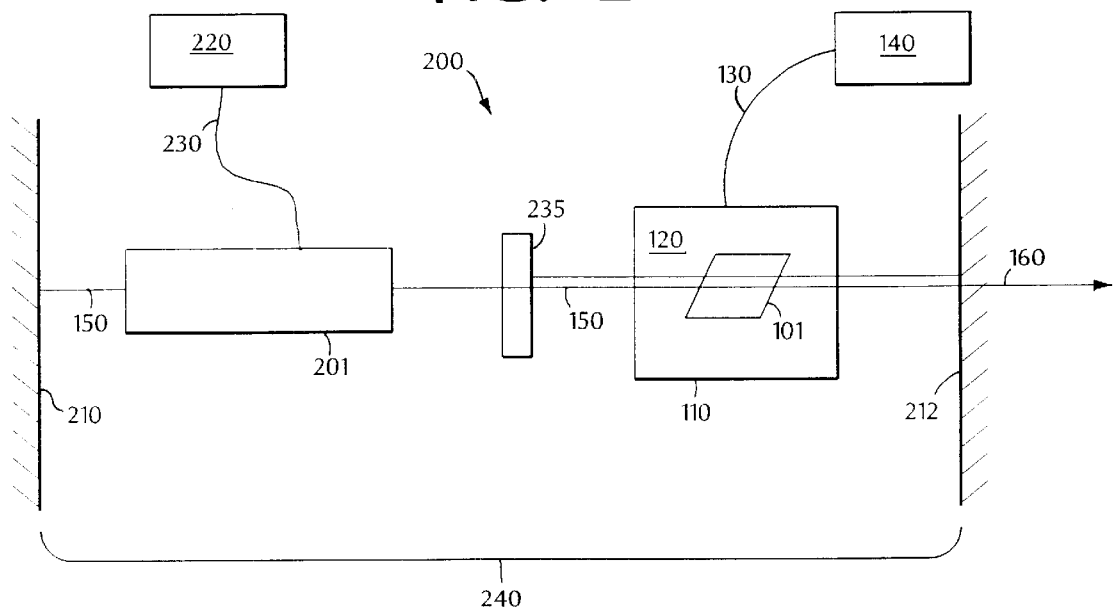
FIG. 2 is a schematic drawing of one embodiment of a light source incorporating the nonlinear optical crystal assembly.

Referring to FIG. 2, another embodiment of the invention is an optical system 200. Optical system 200 includes nonlinear crystal 101, enclosure 110 containing gas mixture 120, and gas supply 140 connected to enclosure 110 by tube 130. Optical system 200 further includes a light source 201, reflectors 210 and 212 and a power supply 220 configured to supply power to light source 201 via cable 230. Light source 201 and enclosure 110 containing gas mixture 120 and nonlinear crystal 101 are positioned between reflectors 210 and 212. Reflectors 210 and 212 are configured to reflect optical radiation impinging thereon at frequency $\omega$, thereby forming an optical cavity 240 for radiation having frequency $\omega$. In the presently described embodiment, light source 201 is an Argon plasma tube. The argon plasma tube provides gain in the optical cavity at frequency $\omega$.

Reflectors 210 and 212 can be any reflectors capable of reflecting optical radiation having frequency $\omega$, for example, reflectors 210 and 212 can be mirrors. Additionally, reflector 212 is configured to transmit at least a portion of optical energy impinging thereon at frequency $2\omega$. Optionally, another reflector 235, configured to reflect energy impinging thereon at frequency $2\omega$, is disposed in cavity 240 between light source 201 and nonlinear crystal 101. Reflector 235 is configured to prevent energy having frequency $2\omega$ from impinging on light source 201. Reflector 235 may or may not be configured to reflect light back towards crystal 101. Reflector 235 may transmit substantially all (e.g., 100%) energy impinging thereon at frequency $\omega$.

Pump beam 150 having frequency $\omega$ is generated by light source 201. A portion of pump beam 150 exits light source 201 through output coupler 202 propagates toward mirror 212 (from left to right). Pump beam 150 impinges on and is substantially transmitted into enclosure 110. Pump beam 150 impinges on nonlinear crystal 101. A portion of pump beam 150 interacts with nonlinear crystal 101 producing output beam 160 having frequency $2\omega$ and propagating from left to right. A portion of pump beam 150 is substantially transmitted by nonlinear crystal 101, exits enclosure 110 and impinges on reflector 212. This radiation is substantially reflected by mirror 212 and now propagates from right to left in cavity 240. This radiation re-enters enclosure 110 and impinges on nonlinear crystal 101. A portion of pump beam 150 interacts with nonlinear crystal 101 producing output beam 160 having frequency $2\omega$ and propagating from right to left. A portion of pump beam 150 is substantially transmitted by nonlinear crystal 101 and exits enclosure 110. Pump beam 150 is substantially transmitted into light source 201 where it interacts with the gain medium of light source 201 and grows in intensity via stimulated emission. Pump beam 150 exits light source 201 and impinges on reflector 210, being substantially reflected back towards light source 201. Pump beam 150 and is substantially transmitted into light source 201 where it interacts with the gain medium of light source 201 and grows in intensity via stimulated emission. Pump beam 150 exits light source 201 and propagates toward enclosure 110.

Output beam 160 having frequency $2\omega$ propagating from left to right in cavity 240 exits enclosure 110, is substantially transmitted by reflector 212 and exits cavity 240. Output beam 160 having frequency $2\omega$ propagating from right to left in cavity 240 exits enclosure 110 and impinges on reflector 235. In some embodiments, output beam 160 is substantially reflected by reflector 235 and propagates from left to right in cavity 240. Output beam 160 enters enclosure 110, is substantially transmitted through nonlinear crystal 101, and exits enclosure 110. Pump beam 160 is substantially transmitted by reflector 212 and exits cavity 240.

While light source 201 in the above-described embodiment is an Argon plasma tube, the invention is not so limited. Light source 201 can be any light source configured to generate optical radiation having frequency $\omega$. For example, light source 201 may contain argon gas or krypton gas, or may be YAG or Alexandrite-based light sources (e.g., YAG or Alexandrite lasers). Light source 201 may optionally include intracavity frequency doublers, triplers, or quadruplers to generate pump radiation with desired frequency $\omega$. In such embodiments light source 201 may include optical elements necessary to couple light from the light source into cavity 240.

In some embodiments, additional optical components (for example, additional reflectors) are included inside cavity 240. One such embodiment is shown as optical system 300 in FIG. 3, and includes an additional reflector 301, configured to substantially reflect radiation impinging thereon having frequency ω. Reflector 301 is placed between an Argon plasma tube 350 and nonlinear crystal 101. System 300 also includes coupler 310 and vacuum bellows 320. Pump beam 150 having frequency ω exits Argon plasma tube 350 via a Brewster window 360 and enters enclosure 110 via coupler 310. Pump beam 150 impinges on reflector 301 and is directed towards nonlinear crystal 101. A portion of pump beam 150 impinging on nonlinear crystal 101 is converted to output beam 160 having frequency 2ω. Pump beam 150 not converted to output beam 160 is substantially transmitted by nonlinear crystal 101. Transmitted pump beam 150 and output beam 160 propagate toward reflector 212. Pump beam 150 impinging on reflector 212 is substantially reflected back towards nonlinear crystal 101. Output beam 160 is substantially transmitted by reflector 212 and exits cavity 240.

Pump beam 150 reflected back towards nonlinear crystal 101 impinges on nonlinear crystal 101. A portion of pump beam 150 impinging on nonlinear crystal 101 is converted to output beam 160 having frequency 2ω. Pump beam 150 not converted to output beam 160 is substantially transmitted by nonlinear crystal 101. Transmitted pump beam 150 and output beam 160 propagated toward reflector 301. Pump beam 150 impinging on reflector 301 exits enclosure 110 via coupler 310. Output beam 160 is substantially transmitted by reflector 301 and exits cavity 240.

Pump beam 150 exiting enclosure 110 via coupler 310 impinges on Brewster window 360 and is substantially transmitted into Argon plasma tube 350 where it interacts with the gain medium of Argon plasma tube 350 and grows in intensity via stimulated emission. Pump beam 150 exits light source 201 through a second Brewster window 370 and impinges on reflector 210, being substantially reflected back towards Argon plasma tube 350. Pump beam 150 impinges on Brewster window 370 and is substantially transmitted into Argon plasma tube 350 where it interacts with the gain medium of Argon plasma tube 350 and grows in intensity via stimulated emission. Pump beam 150 exits light source 201 via output coupler 202 and propagates towards reflector 301.

Figure 3:
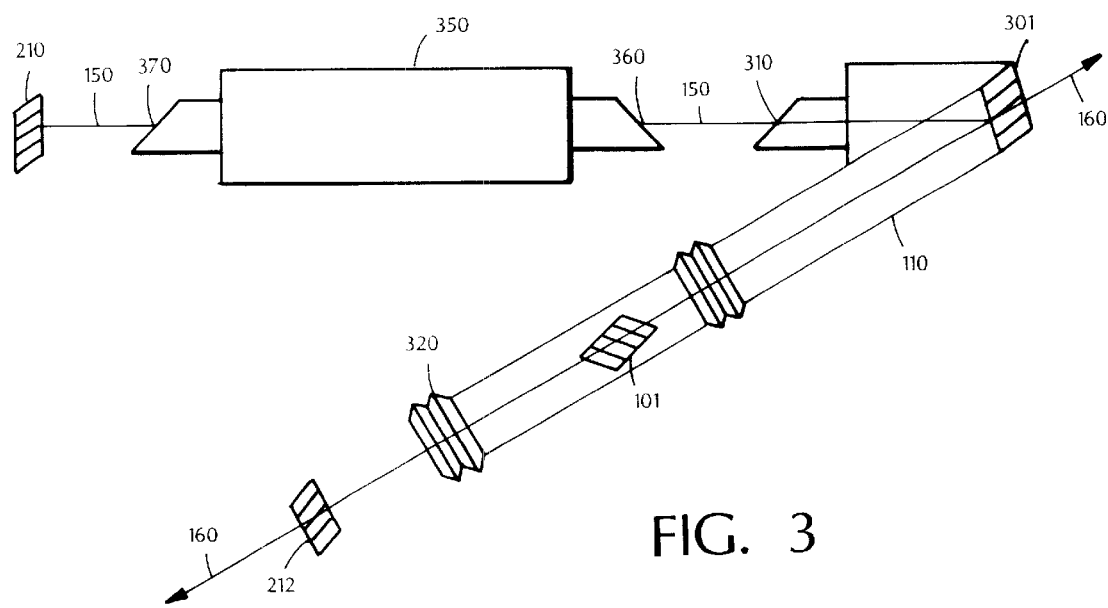
FIG. 3 is a schematic drawing of another embodiment of a light source incorporating the nonlinear optical crystal assembly.

In the configuration shown in FIG. 3, the frequency doubled output beam 160 exits cavity 240 without interacting with light source 201. Additionally, optical system 300 has two output beams having frequency 2ω.

Figure 4:
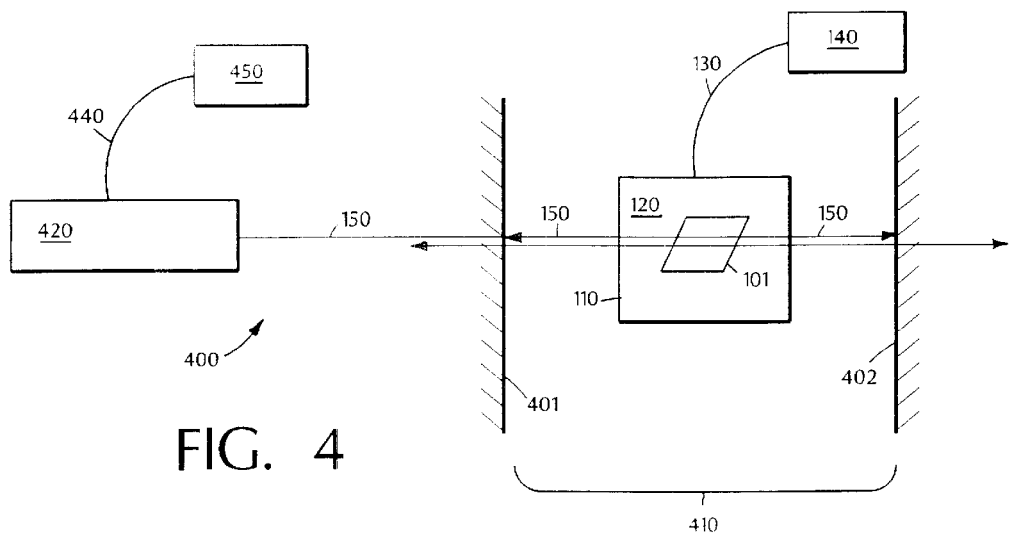
FIG. 4 is a schematic drawing of a further embodiment of a light source incorporating the nonlinear optical crystal assembly.
Figure 5:
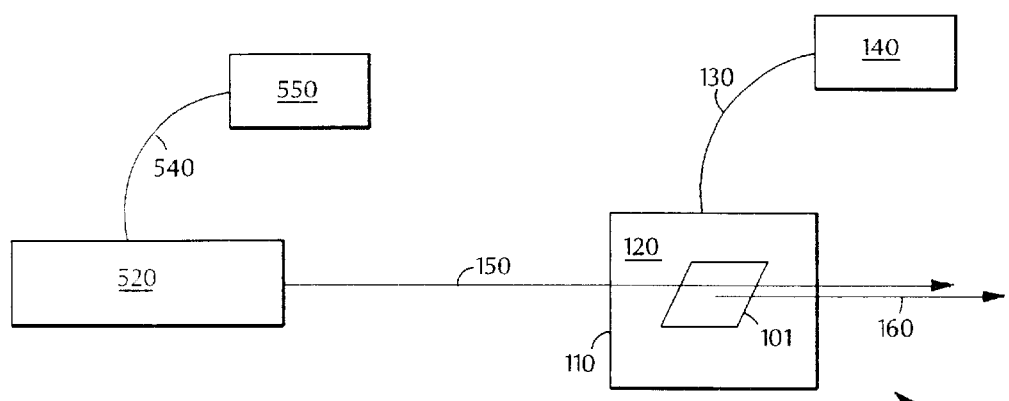
FIG. 5 is a schematic drawing of yet a further embodiment of a light source incorporating the nonlinear optical crystal assembly.

FIGS. 2 and 3 show optical systems wherein the light source is placed within an optical cavity and provides gain for that optical cavity. Alternatively, in other embodiments the light source can be placed outside the optical cavity and provides the pump beam. Optical system 400, shown in FIG. 4, is an example of such an embodiment. Optical system 400 includes nonlinear crystal 101, which is inside enclosure 110 and surrounded by gas mixture 120. Gas mixture 120 is supplied to enclosure 110 by gas supply 140 through tube 130. Nonlinear crystal 101 is placed between two reflectors 401 and 402, configured to reflect radiation having frequency ω. Reflectors 401 and 402 form an optical cavity 410. Optical system 400 additionally includes a single-frequency laser 420 to generate the pump beam at frequency ω and is optionally connected to power supply 450 by cable 440.

Laser 420 operates at a single longitudinal mode to generate the single-frequency pump beam 150. For example, laser 420 may include an etalon to select the longitudinal mode. Pump beam 150 is directed toward optical cavity 410 and impinges on reflector 401. In the absence of the optical cavity, reflector 401 is configured to transmit a small portion (e.g., less than about 20%, less than about 10%, less than about 5%, or less than about 2%) of pump beam 150 into cavity 410. To effectively couple the pump beam into the cavity, the round-trip cavity length of the optical cavity is selected to be a multiple of the single-frequency wavelength. In the embodiment shown in FIG. 4, the reflectors that define the cavity are sufficiently mounted to maintain the desired cavity length.

In other embodiments, however, the cavity length can be maintained by active stabilization system. This may be necessary, for example, when the single-mode frequency from laser 420 varies. In such active stabilization systems the position of one of the mirrors that define the optical cavity may be controlled by a piezoelectric transducer driven by a servo-control system. The servo system drives the transducer in response to a feedback signal indicative of the coupling of the pump beam into the cavity. For example, the feedback signal may be provided by a detector positioned to measure the portion of the pump beam reflected by reflector. Alternatively, for example, the detector may be positioned to measure the intensity of the frequency-doubled output beam emerging from the cavity. Depending on the optics that form the cavity, the beam at the fundamental frequency ω can propagate within the cavity in a single direction, whereby the cavity forms a ring cavity, or fundamental beam can form a standing wave within the cavity, such as in a linear external cavity (such as shown in FIG. 4). Such resonant external doubling cavities are known in the art, see, e.g., Kozlovsky et al. in U.S. Pat. No. 5,027,361, the contents of which are incorporated herein by reference. As described in Kozlovsky et al., ibid, the reflectivity of coupling reflector 401 at the pump beam frequency is impedance matched to losses in optical cavity 410, thereby optimizing coupling of the pump beam into the cavity.

Pump beam 150 transmitted into cavity 410 enters enclosure 110 and impinges on nonlinear crystal 101. A portion of pump beam 150 impinging on nonlinear crystal 101 is converted to output beam 160 having frequency 2ω. Pump beam 150 not converted to output beam 160 is substantially transmitted by nonlinear crystal 101. Transmitted pump beam 150 and output beam 160 exit enclosure 110 and propagate toward reflector 402. Output beam 160 is substantially transmitted by reflector 402 and exits cavity 410. Pump beam 150 impinging on reflector 402 is substantially reflected by reflector 402 and is redirected back toward enclosure 110 and nonlinear crystal 101.

Pump beam 150 enters enclosure 110 and impinges on nonlinear crystal 101. A portion of pump beam 150 impinging on nonlinear crystal 101 is converted to output beam 160 having frequency 2ω. Pump beam 150 not converted to output beam 160 is substantially transmitted by nonlinear crystal 101. Transmitted pump beam 150 and output beam 160 exit enclosure 110 and propagate toward reflector 401. Output beam 160 is substantially transmitted by reflector 401 and exits cavity 410. Pump beam 150 impinging on reflector 401 is at least partially reflected by reflector 401 and is redirected back toward enclosure 110 and nonlinear crystal 101.

Optical systems 200, 300, and 400 are some examples of intracavity systems (i.e. the nonlinear crystal is positioned within an optical cavity having a resonance frequency substantially equal to the harmonic pump beam frequency). Other examples of intracavity systems include embodiments in which the reflectors and/or the light source are placed inside the enclosure. Optical systems of the invention may further include any number of additional optical elements (for example, reflectors, lenses, polarizers, wave plates, anti-reflection coatings, etc.). These optical components may be configured in any way to achieved generation of harmonic output from the fundamental pump beam. Additionally, some embodiments may include a heating stage and temperature controller to control the temperature of the nonlinear crystal as shown in FIG. 1.

Optical systems of the invention need not necessarily include an optical cavity. Another embodiment, not having an optical cavity, is optical system 500, shown in FIG., 5. Optical system 500 includes nonlinear crystal 101, enclosed in enclosure 110 and surrounded by gas mixture 120. Gas mixture 120 is supplied to enclosure 110 from gas supply 140 through tube 130. Optical system 500 further includes a light source 520, and optionally power supply 550. Power supply 550 is connected to light source 520 by cable 540.

Light source 520 generates radiation having frequency $\omega$, which exits light source 520 as pump beam 150. Pump beam 150 is directed toward nonlinear crystal 101 inside enclosure 110. Pump beam 150 enters enclosure 110 and impinges on nonlinear crystal 101. A portion of pump beam 150 impinging on nonlinear crystal 101 is converted to output beam 160 having frequency $2\omega$. Pump beam 150 not converted to output beam 160 is substantially transmitted by nonlinear crystal 101. Transmitted pump beam 150 and output beam 160 exit enclosure 110.

Figure 6:
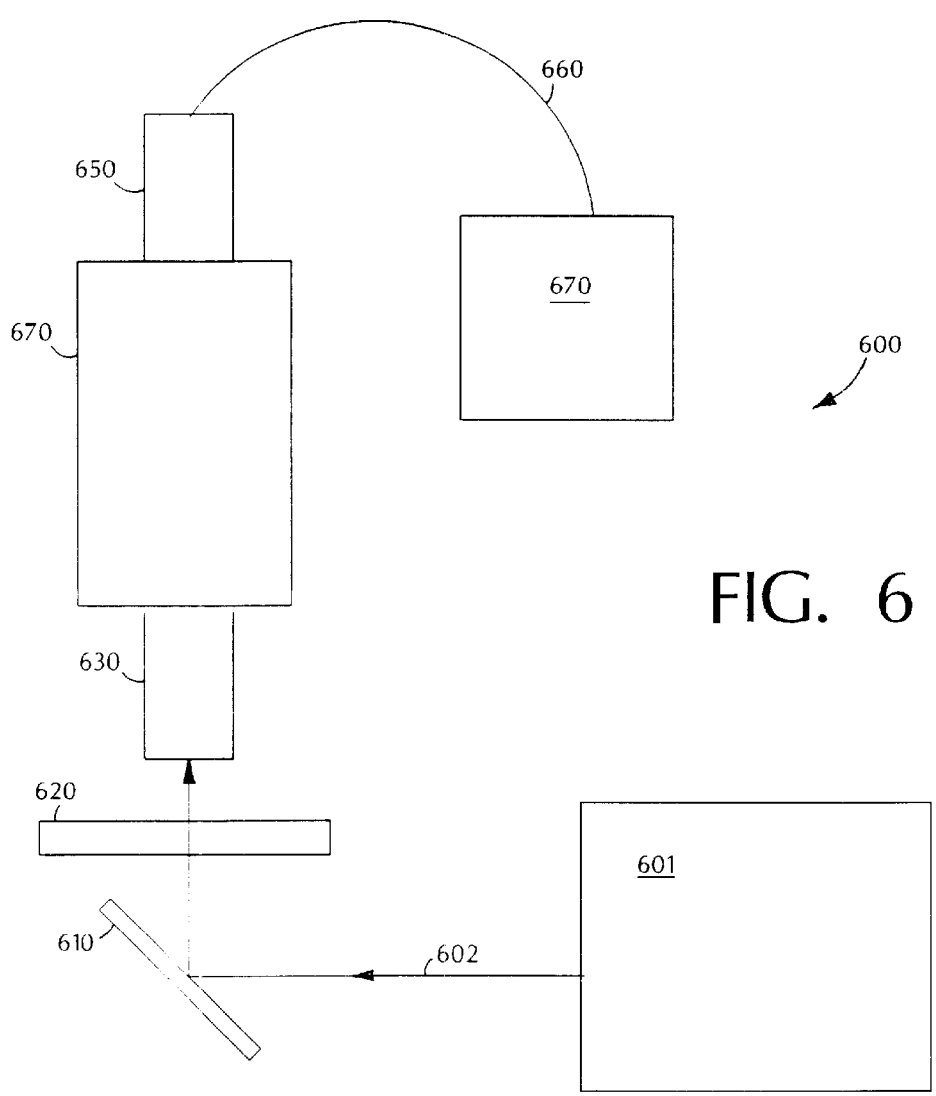
FIG. 6 is a schematic drawing of one embodiment of a microscopy system incorporating the nonlinear optical crystal assembly.

Optical systems 200, 300, 400, and 500 as described above may be incorporated into optical devices that utilize radiation having the frequency of output beam 160. Such optical devices are considered within the scope of the invention. One such optical device is an optical microscope 600, as shown in FIG. 6. Optical microscope 600 includes a light source 601, which generates radiation 602 having a wavelength $\lambda$. Radiation 602 is directed towards a sample (not shown) by optical components including reflector 610. The sample (not shown) is generally placed on a sample stage 620 and within the working distance of an objective lens 630. Radiation 602 that is transmitted by the sample is collected by lens 630 and interacts with optical components within housing 640. Optical components within housing 740 also include imaging optics that image the light collected by lens 630. The focal plane of this image approximately coincides with a detector 650. Detector 650 may be any device capable of detecting radiation having wavelength $\lambda$. For example, detector 650 may be a pixelated charge-coupled device. Detector 650 can be linked by a connector 660 to a machine 670 capable of storing, displaying and/or analyzing the image. For example, machine 670 can be a computer, or a video recorder and/or video monitor.

Optical microscope 600 is configured such that objective lens 630 collects radiation 602 that is transmitted by the sample. In alternative embodiments, optical microscope 600 can be configured such that objective lens 630 collects radiation 602 that is reflected by the sample. Other configurations are contemplated.

In some embodiments, light source 601 generating radiation 602 having a wavelength in the range 190 nanometers to 400 nanometers is desirable. Such embodiments include metrology microscopes used to measure features considered to be too small to be resolved by microscopes utilizing visible wavelengths of light. Examples of such features may be such as those found on photomasks used in semiconductor device manufacturing processes.

An example of an optical system of the invention and comparative example are described. These examples are considered illustrative and are in no way limiting of the invention.

EXAMPLE

An optical system, as shown in FIG. 3, was prepared as follows: A Barium Beta Borate nonlinear crystal, about 12 mm long, was placed inside a glass enclosure. The enclosure was filled with a gas mixture including $H_2$, $O_2$, and Argon. The composition of the gas mixture was 95% Argon, 2.5% Oxygen, and 2.5% Hydrogen. The gas pressure within the enclosure was about 2 Psi greater than ambient pressure. The enclosure was sealed and placed within an optical cavity configured to have a resonance wavelength at 488 nanometers. An Argon plasma tube having was also placed inside the optical cavity. The output beam from the Argon plasma tube having wavelength 488 nanometers was directed towards the BBO nonlinear crystal, and the nonlinear crystal was adjusted until phase matching occurred and a portion of the 488 nanometers radiation incident on the nonlinear crystal was converted to radiation having a wavelength of 244 nanometers.

Figure 7:
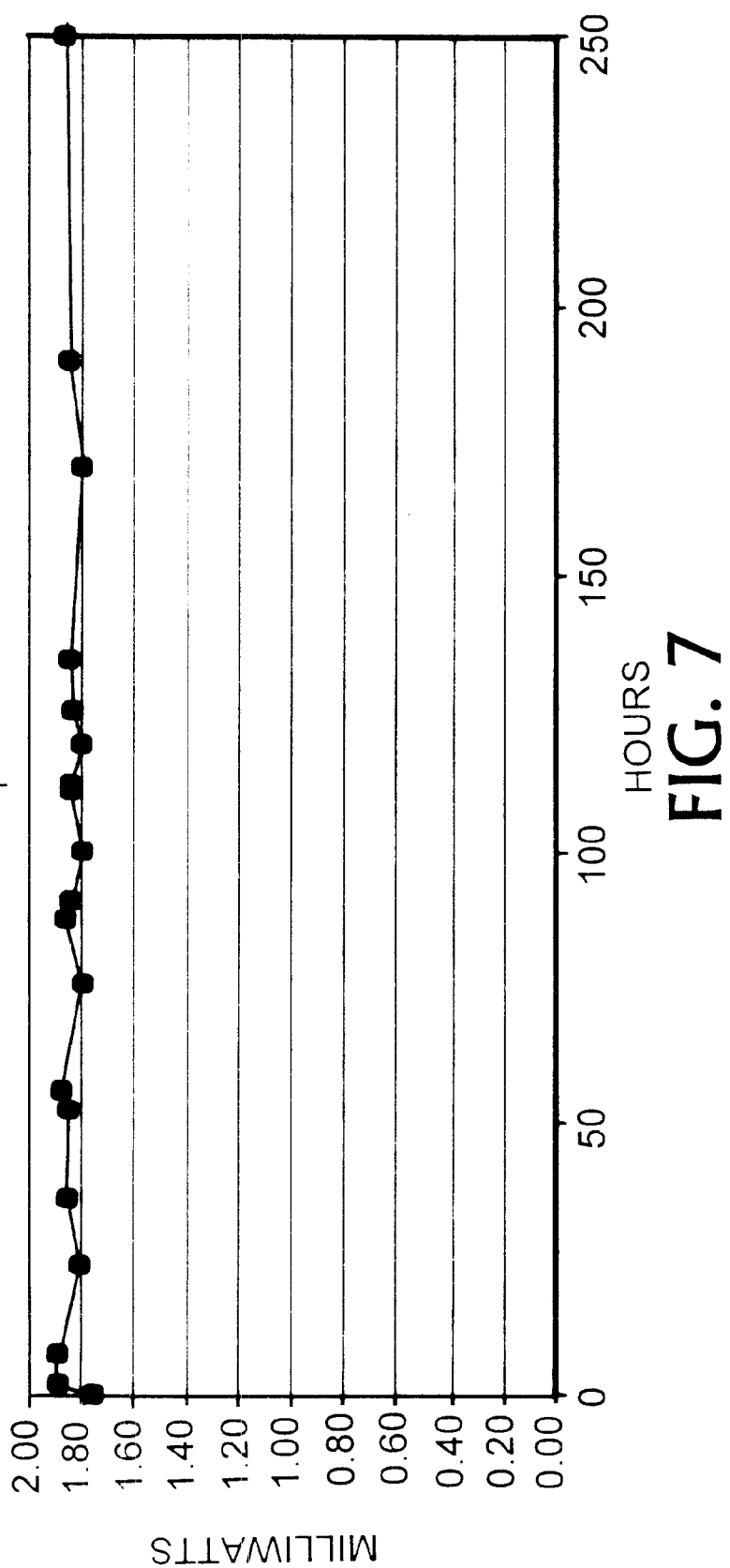
FIG. 7 is graph of output power versus time for an example of the invention.
Figure 8:
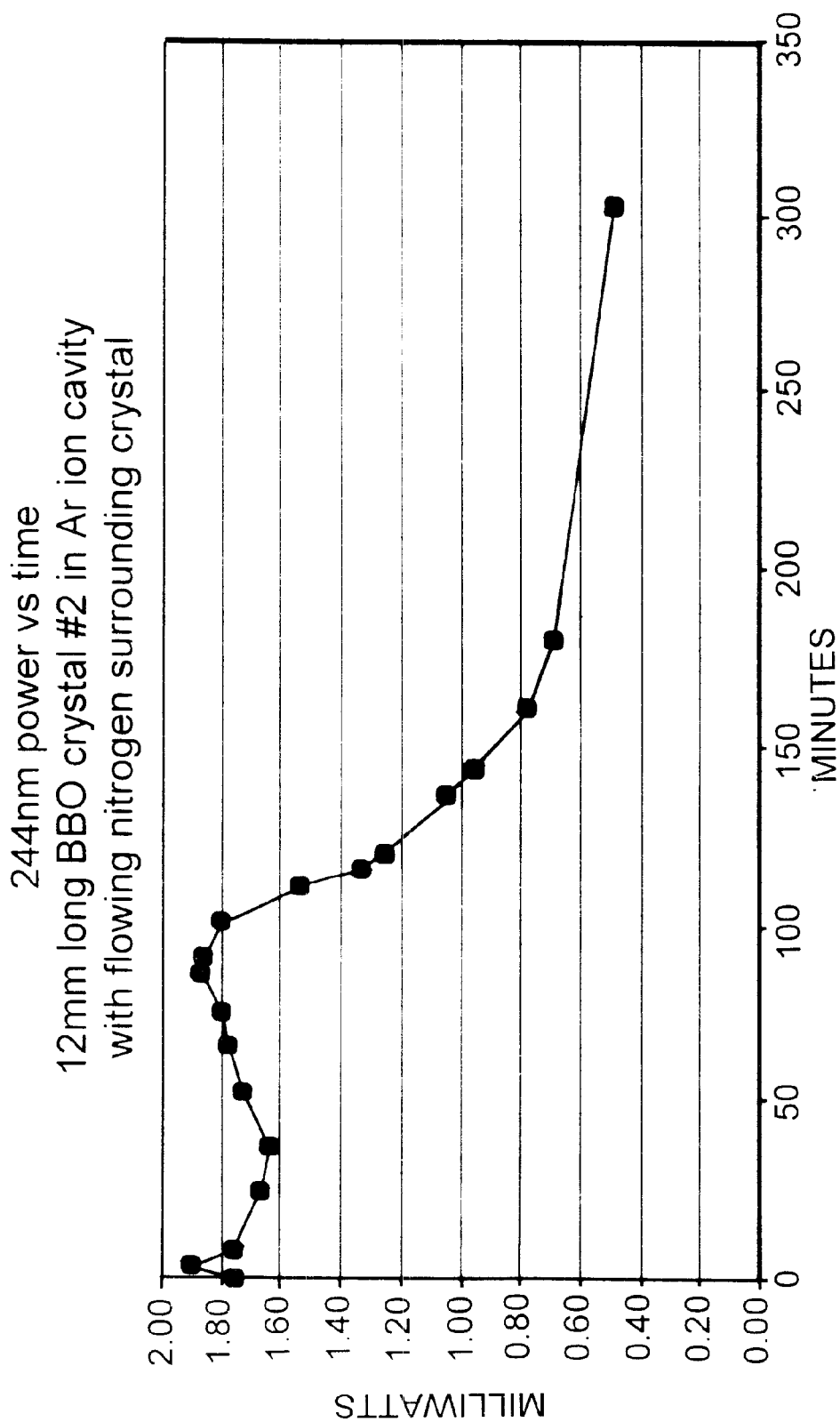
FIG. 8 is graph of output power versus time for a comparative example of the invention.

FIG. 7 shows a graph of the power at 244 nanometers exiting the cavity as a function of time. The power is observed to be about constant at about 1.9 milliwatts for at least 250 hours when the crystal is exposed to a pump beam power density of about 80,000 watts per square centimeter.

Comparative Example

An optical system was prepared as follows: A Barium Beta Borate nonlinear crystal, about 12 mm long, was placed inside a glass enclosure. The enclosure was continuously flushed with nitrogen gas. The enclosure was placed within an optical cavity configured to have a resonance wavelength at 488 nanometers. An Argon plasma tube having was also placed inside the optical cavity. The output beam from the Argon plasma tube having wavelength 488 nanometers was directed towards the BBO nonlinear crystal, and the nonlinear crystal was adjusted until phase matching occurred and a portion of the 488 nanometers radiation incident on the nonlinear crystal was converted to radiation having a wavelength of 244 nanometers.

FIG. 7 shows a graph of the power at 244 nanometers exiting the cavity as a function of time. The power is observed substantially decay from its initial value of about 1.9 milliwatts to about 0.5 milliwatts over a time period of about 300 minutes.

A number of embodiments of the invention have been described. Nevertheless, it will be understood that various modifications may be made without departing from the spirit and scope of the invention. For example, while the embodiments described above refer to the use of nonlinear crystals to generate harmonic frequencies of a fundamental pump beam, the invention is not so limited. In some embodiments, the nonlinear crystal can be used for any nonlinear optical process (e.g., sum frequency conversion, difference frequency conversion, parametric amplification, etc.). Accordingly, other embodiments are within the scope of the following claims.

What is claimed is:

1. An optical system comprising:
    a light source providing a pump beam having a first frequency;
    a nonlinear optical crystal positioned to transform at least a portion of the pump beam into an output beam having a second frequency different from the first frequency; and
    an enclosure filled with gas and surrounding the nonlinear optical crystal, the gas comprising hydrogen and oxygen in amounts sufficient to reduce photochemical degradation of the nonlinear optical crystal caused by the pump beam.

2. The optical system of claim 1, wherein the gas is sealed within the enclosure.

3. The optical system of claim 1, further comprising a gas source coupled to the enclosure for flowing the gas into the enclosure.

4. The optical system of claim 1, wherein the enclosure surrounds the nonlinear optical crystal and the light source.

5. The optical system of claim 1, further comprising a plurality of mirrors defining an optical cavity surrounding the nonlinear optical crystal.

6. The optical system of claim 5, wherein the optical cavity is resonant at the first frequency.

7. The optical system of claim 6, wherein the light source is located within the optical cavity.

8. The optical system of claim 7, wherein the light source comprises a gain medium and the optical cavity resonantly enhances emission from the gain medium to generate the pump beam.

9. The optical system of claim 8, wherein the light source comprises a gas tube and electrical source coupled to the gas tube, and wherein during operation the electrical source produces an ion discharge in the gas tube.

10. The optical system of claim 9, wherein the gas tube is an Argon gas tube.

11. The optical system of claim 6, wherein the light source is located outside of the optical cavity, and wherein during operation the light source couples the pump beam at the first frequency into the optical cavity.

12. The optical system of claim 11, wherein the light source is a laser.

13. The optical system of claim 11, wherein the enclosure surrounds the optical cavity.

14. The optical system of claim 1, wherein the nonlinear optical crystal comprises Boron and Oxygen.

15. The optical system of claim 14, wherein the nonlinear optical crystal is one of Barium Beta Borate, Lithium Triborate, and Cesium Lithium Triborate.

16. The optical system of claim 1, wherein the second frequency is a harmonic of the first frequency.

17. The optical system of claim 1, wherein the gas comprising hydrogen and oxygen further comprises a buffer gas.

18. The optical system of claim 17, wherein the buffer gas is Argon.

19. The optical system of claim 17, wherein the buffer gas is Nitrogen.

20. The optical system of claim 1, wherein the ratio of hydrogen to oxygen is about one to one.

21. The optical system of claim 17, wherein the gas comprising hydrogen and oxygen has a hydrogen concentration of less than or equal to 10%.

22. The optical system of claim 17, wherein the gas comprising hydrogen and oxygen has an oxygen concentration of less than or equal to 10%.

23. The optical system of claim 21, wherein the gas comprising hydrogen and oxygen has an oxygen concentration of less than or equal to 10%.

24. The optical system of claim 23, wherein the gas comprising hydrogen and oxygen has a hydrogen concentration of less than or equal to 3%.

25. The optical system of claim 23, wherein the gas comprising hydrogen and oxygen has an oxygen concentration of less than or equal to 3%.

26. The optical system of claim 24, wherein the gas comprising hydrogen and oxygen has an oxygen concentration of less than or equal to 3%.

27. The optical system of claim 1, wherein the gas comprising hydrogen and oxygen has a hydrogen concentration of greater than or equal to 0.1%.

28. The optical system of claim 1, wherein the gas comprising hydrogen and oxygen has an oxygen concentration of greater than or equal to 0.1%.

29. The optical system of claim 1, wherein the hydrogen comprises hydrogen molecules or hydrogen ions.

30. The optical system of claim 1, wherein the oxygen comprises oxygen molecules, oxygen ions, or ozone.

31. The optical system of claim 18 wherein the gas comprises about 95% Argon, about 2.5% oxygen, and about 2.5% hydrogen.

32. The optical system further comprising a heating element thermally contacted to the nonlinear optical crystal and a temperature controller coupled to the heating element.

33. The optical system of claim 32, wherein during operation the temperature controller causes the temperature of the nonlinear optical crystal to be at least 50° C.

34. The optical system of claim 32, wherein during operation the temperature controller causes the temperature of the nonlinear optical crystal to be at least 70° C.

35. The optical system of claim 1, wherein the gas in the enclosure has a pressure greater than ambient pressure.

36. The optical system of claim 35, wherein the gas pressure is greater than the ambient pressure by an amount up to 10 Psi.

37. The optical system of claim 1, wherein the light source is an Argon ion laser, a Krypton ion laser, a YAG laser, or an Alexandrite laser.

38. The optical system of claim 1, wherein the light source is a continuous wave laser.

39. The optical system of claim 1, wherein the light source is an air-cooled laser.

40. The optical system of claim 1, wherein the second frequency is in the ultraviolet region of the electromagnetic spectrum.

41. An optical system comprising:
a light source providing a pump beam having a first frequency;
a nonlinear optical crystal positioned to transform at least a portion of the pump beam into an output beam having a second frequency different from the first frequency;
an enclosure surrounding the nonlinear optical crystal; and
a gas source of hydrogen and oxygen coupled to the enclosure, wherein during operation the gas source provides the enclosure with amounts of hydrogen and oxygen sufficient to reduce photochemical degradation of the nonlinear optical crystal caused by the pump beam.

42. An nonlinear optical crystal assembly comprising:
a nonlinear optical crystal positioned to transform at least a portion of a pump beam having a first frequency into an output beam having a second frequency different from the first frequency; and
an enclosure filled with gas and surrounding the nonlinear optical crystal, the gas comprising hydrogen and oxygen in amounts sufficient to reduce photochemical degradation of the nonlinear optical crystal caused by the pump beam.

43. An nonlinear optical crystal assembly comprising:
a nonlinear optical crystal positioned to transform at least a portion of a pump beam having a first frequency into an output beam having a second frequency different from the first frequency;
an enclosure surrounding the nonlinear optical crystal; and
a gas source of hydrogen and oxygen coupled to the enclosure, wherein during operation the gas source provides the enclosure with amounts of hydrogen and oxygen sufficient to reduce photochemical degradation of the nonlinear optical crystal caused by the pump beam.

44. An optical microscopy system comprising:

the optical system of claim 1; and a microscope positioned to receive the output beam from the optical source.

45. An optical method comprising:

directing a pump beam having a first frequency to a nonlinear optical crystal positioned to transform at least a portion of a pump beam into an output beam having a second frequency different from the first frequency; and surrounding the nonlinear optical crystal with a gas comprising hydrogen and oxygen in amounts sufficient to reduce photochemical degradation of the nonlinear optical crystal caused by the pump beam.

* * * * *

UNITED STATES PATENT AND TRADEMARK OFFICE
CERTIFICATE OF CORRECTION

PATENT NO. : 6,667,828 B2
DATED : December 23, 2003
INVENTOR(S) : William A. Shull It is certified that error appears in the above-identified patent and that said Letters Patent is hereby corrected as shown below:

Column 2,
Line 41, after "may" insert -- be --
Line 50, between "single" and "frequency" insert -- - --
Line 64, after "may" insert -- be --

Column 3,
Line 34, after "features" replace "an" with -- a --

Column 11,
Line 1, replace "achieved" with -- achieve --

Column 12,
Lines 8 and 28, delete "having" after "tube"

Column 14,
Lines 47 and 57, before "nonlinear" replace "An" with -- A --

Signed and Sealed this

Eighteenth Day of May, 2004

JON W. DUDAS
*Acting Director of the United States Patent and Trademark Office*